(12) United States Patent
Cobb

(10) Patent No.: US 6,427,498 B1
(45) Date of Patent: Aug. 6, 2002

(54) ANTI-THEFT WHEEL LOCKING APPARATUS

(76) Inventor: Raymond E. Cobb, Rte. 1, Box 42, Marlow, OK (US) 73534

( * ) Notice: Subject to any disclaimer, the term of this patent is extended or adjusted under 35 U.S.C. 154(b) by 64 days.

(21) Appl. No.: 09/662,529

(22) Filed: Sep. 14, 2000

(51) Int. Cl.[7] .......................... E05B 67/38; B60R 25/00
(52) U.S. Cl. ................... 70/56; 70/226; 70/227
(58) Field of Search ................ 70/54–56, 226, 70/DIG. 43, DIG. 56, 225, 227

(56) References Cited

U.S. PATENT DOCUMENTS

| | | | | |
|---|---|---|---|---|
| 1,307,161 A | * | 6/1919 | Stubblefield | 70/227 |
| 1,333,878 A | * | 3/1920 | Smith | 70/253 |
| 1,426,534 A | * | 8/1922 | Baker | 70/253 |
| 1,504,220 A | * | 8/1924 | Degen | 70/227 |
| 3,606,423 A | * | 9/1971 | McCarthy | 292/205 X |
| 3,713,668 A | * | 1/1973 | Flindt | 70/226 X |
| 4,175,410 A | * | 11/1979 | Schwaiger | 70/226 |
| 4,322,102 A | * | 3/1982 | Lindblom | 292/148 X |
| 4,380,160 A | * | 4/1983 | Hoffman | 70/14 |
| 4,488,417 A | * | 12/1984 | Werner | 70/253 |
| 4,622,833 A | * | 11/1986 | Shepherd | 70/226 |
| 4,768,359 A | * | 9/1988 | Wade | 70/226 X |
| 4,873,851 A | * | 10/1989 | Arnett | 70/56 X |
| 5,261,258 A | * | 11/1993 | Bunger | 70/56 |
| 5,372,018 A | * | 12/1994 | Smith | 70/18 |
| 5,463,885 A | * | 11/1995 | Warren, Sr. | 70/18 |
| 5,475,995 A | * | 12/1995 | Livingston | 70/259 |

* cited by examiner

*Primary Examiner*—Lloyd A. Gall
(74) *Attorney, Agent, or Firm*—Thomas R. Weaver

(57) ABSTRACT

An apparatus is provided for locking a wheel of a vehicle against rotation for the prevention of vehicle theft. A contacting element has one end releasably connectable to a portion of the vehicle undercarriage. The contacting element extends through an opening in a vehicle wheel. A stabilizing element is positioned immediately adjacent an outside portion of the wheel and a padlock is connected to the connecting element through a hole there through.

2 Claims, 4 Drawing Sheets

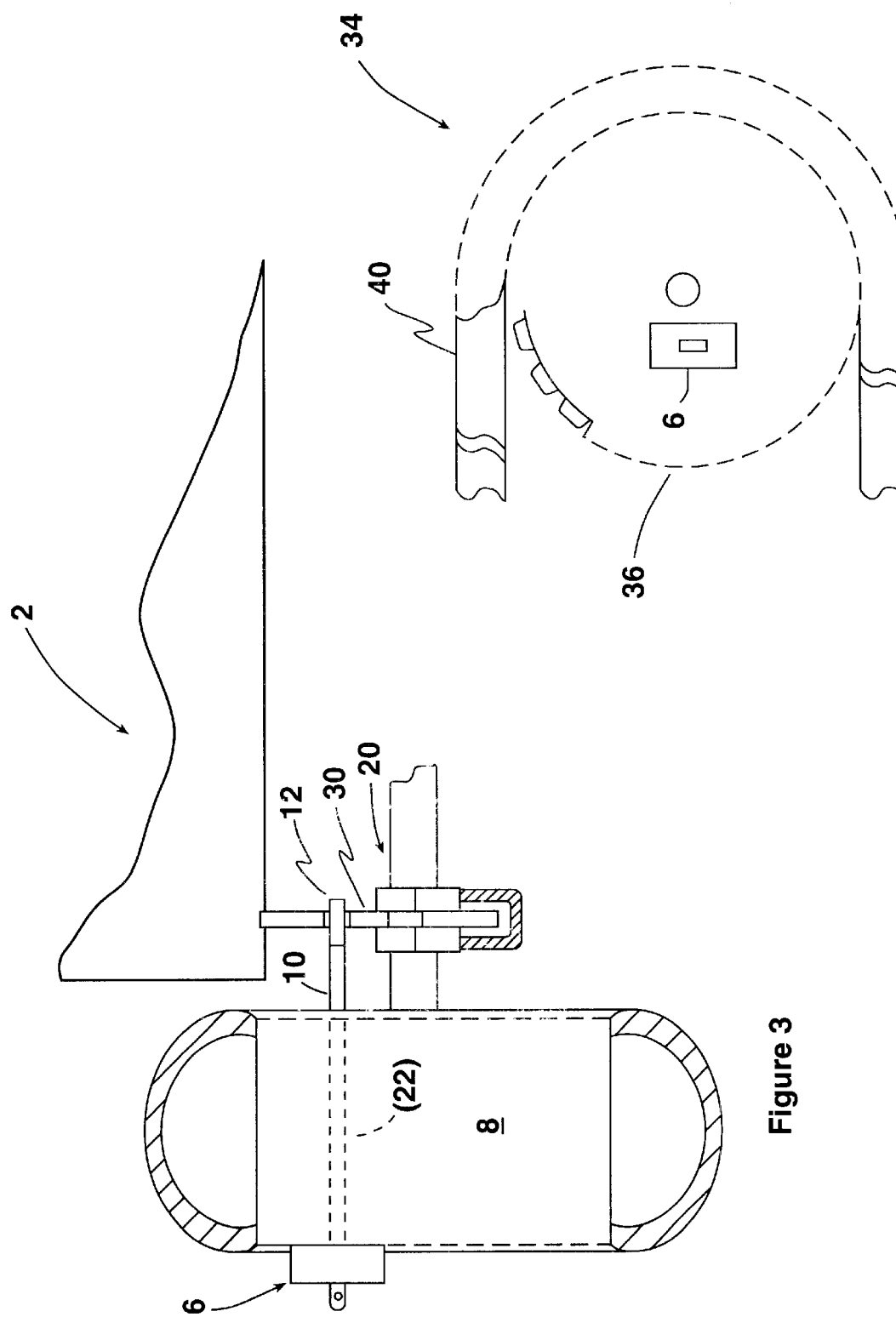

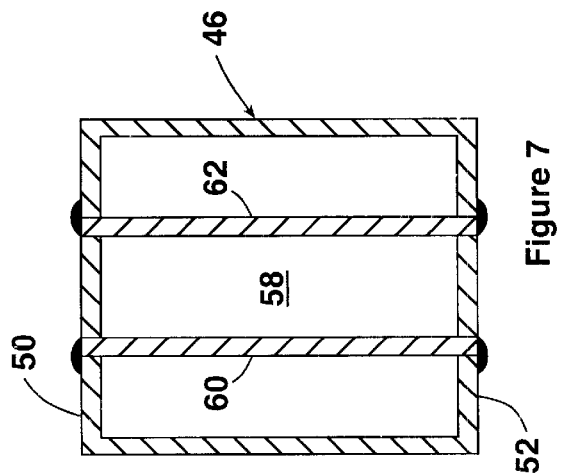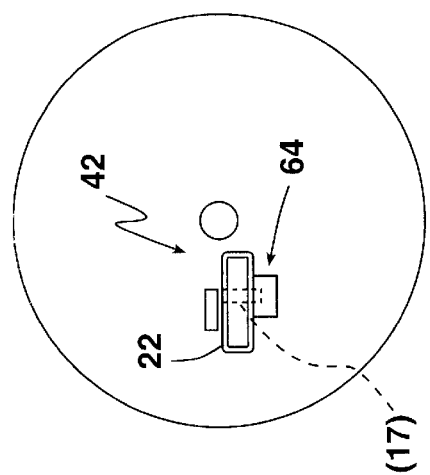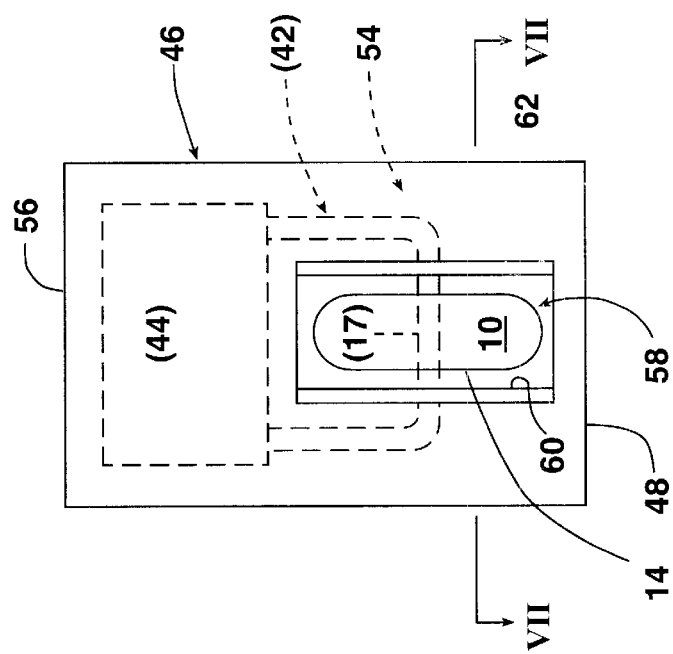

ANTI-THEFT WHEEL LOCKING APPARATUS

BACKGROUND OF THE INVENTION ART

1. Technical Field of the Invention

This invention relates to vehicle safety apparatus. The invention further relates to an apparatus for the prevention of vehicle theft. The invention particularly relates to an apparatus for the prevention of theft of a vehicle having a wheel mounted thereon. The invention more particularly relates to a chassis-mounted, wheel-locking device constructed for preventing the theft of the vehicle, such as a trailer, upon which the wheel is mounted.

2. Description of the Prior Art and Problems Solved

One of the problems with owning a vehicle is that of theft. This is especially true if the vehicle is a trailer. Many states do not have trailer licensing laws. Trailers in those states are particularly vulnerable to theft.

Various and diverse methods of protecting a vehicle, such as trailer, against theft have been attempted with various and diverse degrees of success. In this regard, trailer owners have removed the hitch portion of the trailer to deter theft. This method of anti-theft is marginally effective since all a thief has to do is to bring a spare hitch to the scene, bolt it to the trailer, connect the hitch to his (or her) vehicle and drive away.

Other owners, to prevent theft, have removed one or more wheels from the trailer. This method is likewise marginal. For the price of a tire and wheel and the time to install the same, a thief can steal a trailer worth sometimes thousands of dollars.

A tire boot is often used by police to prevent rotation of a wheel and movement of a vehicle. These apparatus are expensive and complex to construct. Such boot safety features are also easily by-passed by removing and replacing the boot-equipped wheel.

The methods employed in the art, as briefly described above, have thus included the removal of towing apparatus, the removal of support and wheel apparatus and the installation of apparatus to prevent wheel rotation.

Still other owners have fastened the entire trailer structure to an immovable structure, such as, passing a chain around the trailer structure and securing it to a tree or some other massive item. It requires little challenge or effort for a thief to cut the chain and steal the vehicle.

The apparatus of this invention solves one or more of the above mentioned problems. The apparatus finds particularly utility on boat trailers, corn hauling trailers, utility trailers, camping trailers, track type recreational vehicles, and track type work vehicles, which, as is customary, remain unattended for long periods of time at sometimes remote locations. Such vehicles, if not secured in some manner, are particularly susceptible to theft.

THE INVENTION

Disclosure of the Invention

In one aspect, the invention is an apparatus for locking a wheel of a vehicle to the vehicle and for preventing rotation of the wheel which is locked to the vehicle. In another aspect, the invention is a method for locking a wheel of a vehicle to the vehicle and for preventing rotation of the locked wheel to prevent theft of the vehicle. The apparatus functions to prevent theft of the vehicle.

The apparatus is an elongated connecting member comprising a first end portion, a second end portion and a stabilizing assembly. The said first end portion is non-linear and has a general "J" configuration. The said second end portion is substantially linear and is equipped with a plurality of holes extending along a portion of its length. The said stabilizing assembly is adapted to slidably move along the length of the said second end portion and is still further adapted to cooperate with at least one of the said holes in said second end portion to lock the connecting member relative to the vehicle wheel and the wheel to the vehicle whereby rotation of the wheel is prevented.

The method of the invention is comprised of hooking a first portion of an elongated connecting member to a portion of the undercarriage of a vehicle while passing a second portion of the said connecting member through an opening of a wheel of said vehicle, sliding a stabilizing member onto a portion of the said second end portion of said connecting member, urging the said first end portion of the said connecting member into forcible engagement with the said undercarriage portion of said vehicle and then locking said stabilizing member to said second end portion of said connecting member at a location immediately adjacent the said wheel of said vehicle.

BRIEF DESCRIPTION OF THE DRAWINGS

FIG. 3 is a diagrammatic view of a portion of a vehicle having the apparatus of this invention attache thereto.

FIG. 4 is a diagrammatic partial side view of a drive wheel of a track type vehicle having the apparatus of this invention attached thereto.

FIG. 6 is a diagrammatic end view of the stabilizing member, connecting member and a partial view of the padlock.

FIG. 7 is a diagrammatic top view taken along lines VII—VII of FIG. 6.

FIG. 8 is a diagrammatic side view of a wheel having a different embodiment of the locking device of this invention.

DESCRIPTION OF THE PREFERRED EMBODIMENTS

Figure 1:
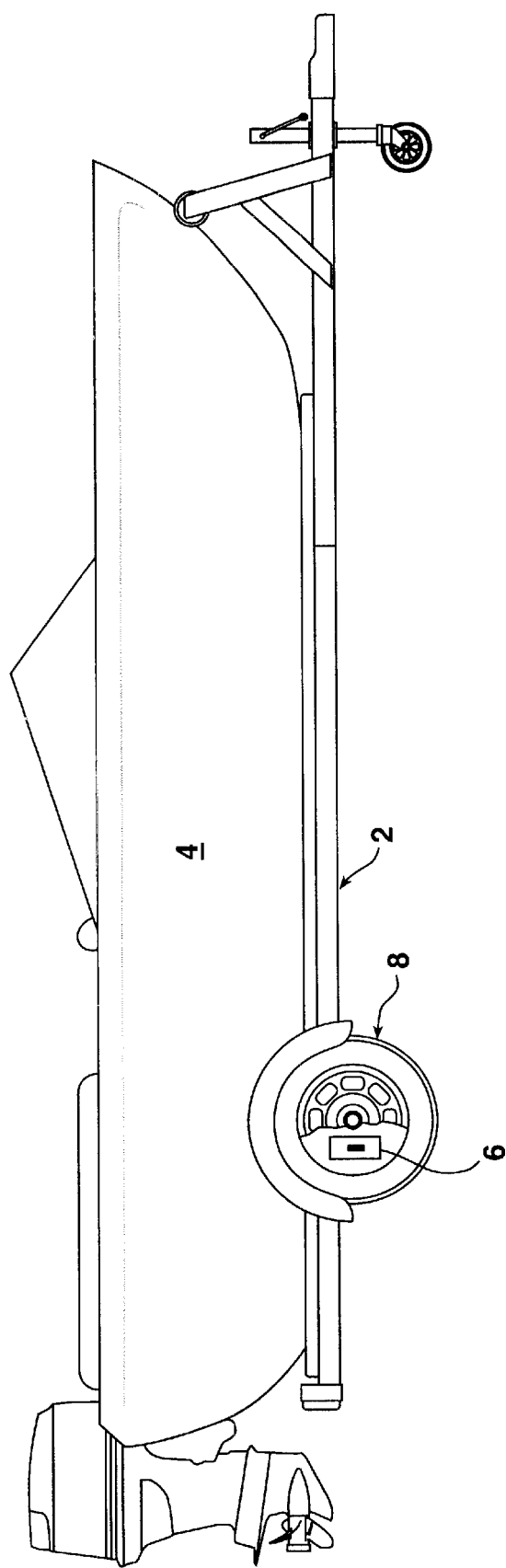
FIG. 1 is a diagrammatic side view of a vehicle having the apparatus of this invention attached thereto.

Referring now to FIG. 1, a vehicle 2, for example, a trailer for transporting a boat 4, is shown having connected thereto the anti-theft apparatus 6 of this invention. Apparatus 6, as shown, is secured to vehicle 2 such that apparatus 6 prevents rotation of wheel 8 of vehicle 2 and also locks wheel 8 to vehicle 2, as shall be more fully described below.

Figure 2:
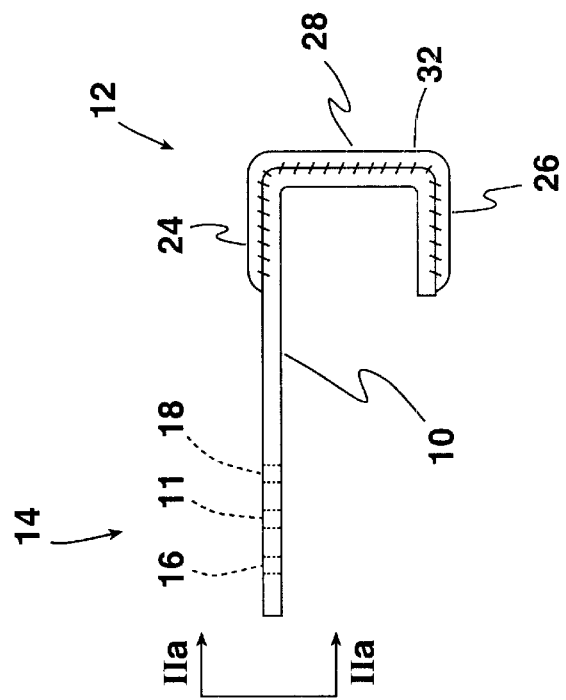
FIG. 2 is a diagrammatic side view of the elongated connecting member of the apparatus of this invention.
Figure 2A:
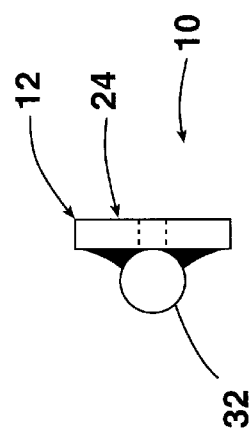
FIG. 2a is a diagrammatic end view of a portion of the elongated connecting member taken along lines IIa—IIa of FIG. 2.

Referring to FIG. 2, an element of apparatus 6, specifically elongated connecting member 10 is shown having a first end portion 12 and a second end portion 14. The first end portion 12 of connecting member 10 is non-linear and has the general shape of the letter "J". The second end portion 14 of the member 10 is substantially linear and has a plurality of spaced apart holes, such as holes 16, 17, and 18, which extend along a portion of its length. In a preferred embodiment connecting member 10 is rectangular in cross-section, as is shown in FIG. 2a.

Referring to FIG. 3, it is seen that first end portion 12 of connecting member 10 is releasably attached or hooked to an undercarriage portion 20 of vehicle 2 and that second end portion 14, not shown, extends through an opening 22 of wheel 8 and outwardly from wheel 8. Accordingly, connecting member 10 must have a length sufficient to enable first end portion 12 to attach to an undercarriage portion 20 and to enable second end portion 14 to extend outwardly from wheel 8.

As can be best seen in FIG. 2, first end portion 12 of connecting member 10 is defined by first leg 24 which is spaced apart from second leg 26 by middle portion 28.

Referring to FIGS. 2 and 3, middle portion 28 is connected to and extends transversely between first leg 24 and second leg 26. Middle portion 28 is of a length sufficient to enable said first end portion 12 to be hooked onto undercarriage portion 20 of vehicle 2. In this regard, it is shown in FIG. 3 that first end portion 12 is hooked to leaf springs 30 of vehicle 2. However, it should be understood that first end portion 12 can be hooked to other portions of vehicle 2 without departing from the scope of this is invention.

It has been found that the linear dimension of middle portion 28 must not be so short or so long to undesirably interfere with hooking first end portion 12 to vehicle 2. It is believed that such undesirable interference can be avoided if middle portion 28 has a length in the range of from about two to about six inches. It is believed that dimensions outside of this range are undesirable because diminished or excessive distances between legs 24 and 26 can produce the mentioned undesirable interference. Preferably, in particular for use in connecting first end portion 12 to leaf springs 30, middle portion 28 is constructed to maintain the first and second legs 24 and 26 spaced apart a distance of about three inches.

It should be understood that the various enumerated parts of connecting member 10, that is, first and second legs 24 and 26, middle portion 28 and first and second end portions 12 and 14, can be separate pieces welded together or can, more preferably, be of unitary construction.

Connecting member 10 is preferably formed of steel. As can be seen in FIG. 2, first end portion 12 can have a greater mass per unit length than the mass per unit length of second end portion 14. In this regard note FIGS. 2 and 2a which show, in FIG. 2a, an end view of the connecting member 10 and the first leg 24 thereof and, in FIG. 2, that the mass per unit length of first end portion 12 is greater than the mass per unit length of second end portion 14 which is caused by reinforcing member 32, such as a steel bar, welded to the first and second legs 24 and 26 and the middle portion 28.

It is not a requirement for the operability of this invention that the mass per unit length of end portion 12 be equal to, greater than, or less than the mass per unit length of end portion 14.

Figure 5:
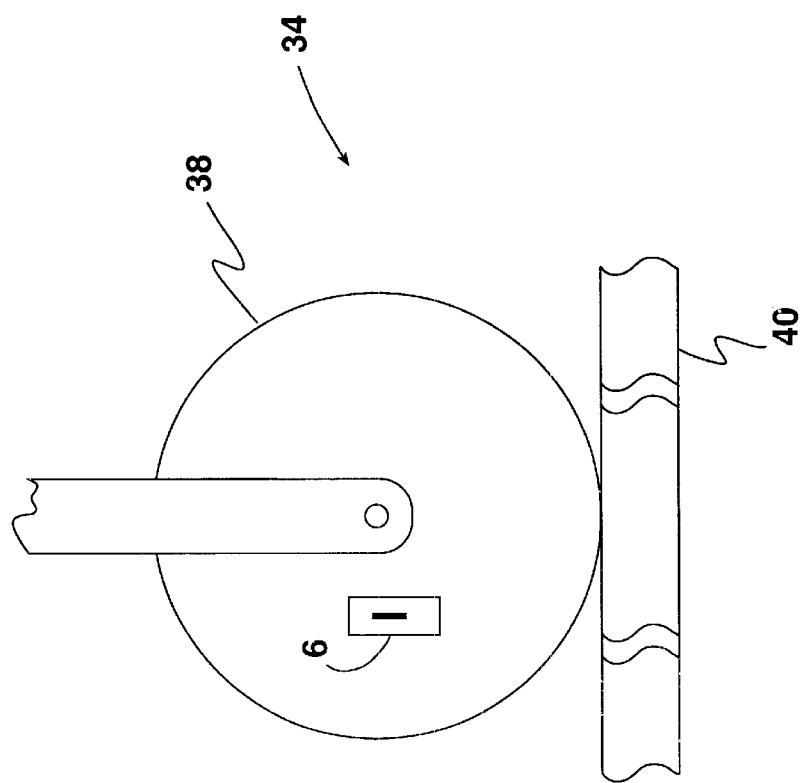
FIG. 5 is a diagrammatic partial side view of a bogie wheel of a track type vehicle having the apparatus of this invention attached thereto.

Referring to FIGS. 4 and 5, the apparatus 6 of this invention can also be used on track type vehicles 34 in association with and locking the drive wheel 36, as shown in FIG. 4, and/or by locking the bogie wheel 38 as shown in FIG. 5. With track type vehicles 34 which are self propelled, the invention would best be used for locking the drive wheel 36.

Referring to FIGS. 3, 6 and 7, a locking device 42 cooperates with one of the spaced apart holes of second end portion 14, such as hole 17, for releasably locking connecting member 10 to vehicle 2 and wheel 8 to vehicle 2. Locking device 42 comprises padlock 44 and stabilizing member 46. Stabilizing member 46 is preferably of general box configuration having a base 48, opposed walls 50 and 52, a chamber 54 having an open end 56, and an opening 58 through walls 50 and 52.

Opening 58 which extends through walls 50 and 52 is of dimensions sufficient for receiving second end portion 14 of connecting member 10. Second end portion 14 preferably has a width several times greater than the thickness thereof. Chamber 54 of stabilizing member 46 is of dimensions sufficient for receiving the padlock 44 therein with a portion of the padlock 44 extending through hole 17 of connecting member 10.

Opening 58 through walls 50 and 52 of the stabilizing member 46 can be a slot formed by first and second breakaway plates 60 and 62. Breakaway plates 60 and 62, which are not required for operability of apparatus 6, are positioned on opposed sides of the slot, extend through the chamber 54 and are each connected on opposed ends to a respective wall 50 and 52 at respective wall opening edge. Preferably, this connection is by welding.

FIG. 8 shows another embodiment of the locking device 42 which has a key bar lock 64 which is extendable through hole 17 of second end portion 14 and has a length sufficient to span an associated wheel opening 22. This type locking device 42 is operable, but it is believed that it does not provide the protection afforded by the stabilizing member 46 and the padlock 44.

In the embodiment shown in FIGS. 6 and 7, one should appreciate the fact that if the stabilizing member 46 is repeatedly hit with a sledge hammer in order to remove anti-theft apparatus 6, the welds of the first and second breakaway plates 60 and 62 will shear and further complicate removal by impact.

OPERATION OF THE INVENTION

In the operation of the anti-theft apparatus 6 of this invention, first end portion 12 of elongated connecting member 10 is hooked about an undercarriage portion 20 of vehicle 2 while passing second end portion 14 of the said connecting member 10 through an opening 22 of a wheel 8 of vehicle 2.

Second end portion 14 is inserted into stabilizing member 46 by way of opening 58 in walls 50 and 52 to enable stabilizing member 46 to slide on second end portion 14. Stabilizing member 46 is then slid onto connecting member 10 and first end portion 12 is urged into forcible engagement with the said undercarriage portion 20. Stabilizing member 46 is then urged against wheel 8 and locked to second end portion 14 by padlock 44 in cooperation with a hole 17 in second end portion 14.

Other aspects, objects, and advantages of this invention can be obtained from a study of the drawings, the disclosure and appended claims.

Having thus described the invention, that which is claimed is:

1. An apparatus for locking a wheel of a vehicle to said vehicle and for opposing rotation of said wheel, said apparatus being comprised of an elongated connecting member and a locking device:

said elongated connecting member having a first end portion and a second end portion, said first end portion being non-linear and having a general "J" configuration and said second end portion being substantially linear and having a plurality of holes extending along a portion of the length thereof; and said locking device being comprised of a padlock and a stabilizing member having a general box configuration defining a chamber, said stabilizing member being comprised of a base, an open end opposite said base and four walls including a first side wall, and a second side wall opposite said first side wall, wherein a first opening penetrates said first side wall and a second opening, in alignment with said first opening, penetrates said second side wall, said first opening and said second opening having dimensions sufficient to enable said stabilizing member to slidably move along the length of said second end portion of said elongated connecting member having said plurality of holes, and wherein said chamber has dimensions sufficient for receiving said padlock extending therein with a portion of the padlock extending through one of said holes in said second end portion of said connecting member.

2. An apparatus for locking a wheel of a vehicle for the prevention of theft, said vehicle having an undercarriage and said wheel having an opening, comprising:

an elongated connecting member having a first end portion and a second end portion, said first end portion being of a configuration for hooking to a portion of said undercarriage, said second end portion having a plurality of spaced apart holes extending along its length, and said connecting member having a length sufficient for extending from said portion of said undercarriage through said wheel opening and outwardly from said wheel; and locking means for locking the second end portion of said connecting member to said wheel, said locking means being comprised of a padlock and a stabilizing member, said stabilizing member, having a general box configuration defining a chamber, said box comprising a base, an open end opposite said base, a first side wall, and a second side wall opposite said first side wall, wherein a first opening penetrates said first side wall and a second opening penetrates said second side wall, said first opening and said second opening having dimensions sufficient to enable said stabilizing member to slidably move along the length of said second end portion of said elongated connecting member, and wherein said chamber has dimensions sufficient for receiving said padlock extending therein with a portion of the padlock extending through one of said holes in said second end portion of said connecting member.

* * * * *